Feb. 2, 1971  V. E. BROWN  3,560,844
METHOD AND APPARATUS FOR MEASURING THE OPERATING-TIME
OF AN ELECTROMAGNET, UTILIZING A PIEZOELECTRIC DEVICE
Filed Oct. 14, 1968
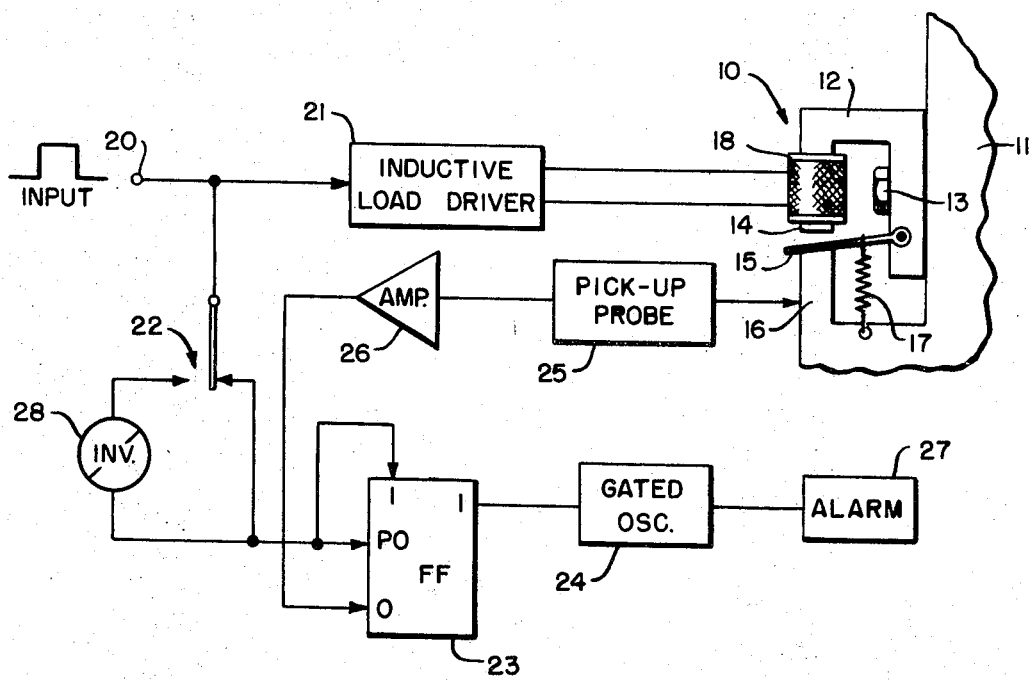
INVENTOR
VERNON E. BROWN
BY Michael A. O'Neil
ATTORNEY United States Patent Office 3,560,844
Patented Feb. 2, 1971

3,560,844
METHOD AND APPARATUS FOR MEASURING THE OPERATING-TIME OF AN ELECTROMAGNET, UTILIZING A PIEZOELECTRIC DEVICE
Vernon E. Brown, Cabot, Ark., assignor to Teletype Corporation, Skokie, Ill., a corporation of Delaware
Filed Oct. 14, 1968, Ser. No. 767,329
Int. Cl. G01r 31/02
U.S. Cl. 324—28                                     3 Claims

ABSTRACT OF THE DISCLOSURE

An operating-time measuring device for electromagnets of the type that drive an armature into engagement with a fixed stop includes a flip-flop that is set upon actuation of the magnet, a piegoelectric pickup probe responsive to vibrations caused by engagement of the armature of the electromagnet with the stop for producing a flip-flop resetting pulse, and a gated oscillator that is operated whenever the flip-flop is set for producing an alarm output if the flip-flop is not reset by the output of the piezoelectric probe within a predetermined time.

BACKGROUND OF THE INVENTION

The manufacture of the electromagnetic devices frequently includes the step of testing the operating times of electromagnets produced, to determine whether the electromagnets meet certain minimum requirements. When the electromagnets operate to either close or open contacts such testing is straightforward, since the contacts can be employed to determine when the magnet has operated. Frequently, however, electromagnets are used to produce purely mechanical outputs, and accordingly are not provided with contacts. Heretofore it has been difficult at best to provide an operating-time testing device that is both reliable and easy to use for electromagnets that do operate contacts.

SUMMARY OF THE INVENTION

In the preferred embodiment, an operating-time testing system senses vibrations caused by engagement of a moving member with a fixed stop, preferably employing an electromechanical transducer probe. The elapsed time between actuation of the moving member and detection of vibrations is then determined, preferably by circuitry including a binary device having one input responsive to the initiation of movement and another input responsive to the sensing of vibrations.

DESCRIPTION OF THE DRAWING

A more complete understanding of the invention may be had by referring to the following detailed description when taken in conjunction with the drawing wherein the preferred embodiment of the invention is schematically illustrated.

DETAILED DESCRIPTION

Referring now to the drawing, there is shown an electromagnet structure 10 to be tested that is mounted on a frame 11 formed from a nonmagnetic material such as brass or the like. The electromagnet structure 10 includes a core 12 formed from a magnetic material that is secured to the frame 11 by a fastener 13 and that includes a pole 14. An armature 15 is pivotally supported on the core 12 for movement between the pole 14 and an abutment 16 on the frame 11. A spring 17 is connected between the armature 15 and the frame 11 and urges the armature 15 toward the abutment 16. A coil 18 of conductive material is mounted on the core 12 for generating magnetic flux and thereby driving the armature 15 into engagement with the pole 14 against the action of the spring 17. The pole 14 and the abutment 16 serve as stops for limiting the travel of the armature 15.

In the illustrated embodiment of the invention the method and apparatus shown are designed to test both the pickup time and the release time of the electromagnet structure 10, both of which are referred to as the operating time of the structure. To measure the pick-up time of the armature 15 an input pulse is applied to a terminal 20. The input pulse triggers a conventional inductive load driver 21 which produces a coil energizing output and thereby energizes the coil 18. The input pulse is also directed through a switch 22, which controls whether the pickup time or the release time of the electromagnet structure 10 will be tested, to a flip-flop 23 which is normally reset to its "0" state and which is permanently primed to the set "1" state. The output of the switch 22 is connected to the flip-flop 23 in such a manner that the input pulse is applied to the "1" trigger input to set the flip-flop 23 to its "1" state and also is applied to the PO priming input of the flip-flop 23. A conventional gated oscillator 24 is connected to the set "1" output of the flip-flop 23 and is held inoperative when the flip-flop 23 is set to its "0" state. The oscillator 24, however, is actuated for operation in response to the input pulse when the flip-flop 23 is set to its "1" state. At a predetermined later time, a first output pulse is emitted by the oscillator 24.

A mechanical vibration pick-up probe 25, which may be any of the commercially available piezoelectric crystals or any similar device that translates mechanical vibrations into an electrical output, is engaged with the frame 11 or the core 12 and is used to produce an output pulse in response to vibrations caused by collision of the armature 15 of the electromagnet structure 10 with the pole 14 of the core 12. The output of the probe 25 is directed through an amplifier and pulse shaping circuit 26 to the "0" trigger input of the flip-flop 23 and operates to reset the flip-flop 23 to its "0" state since a priming input is present at the PO input of the flip-flop 23.

If the probe 25 produces an output pulse before the gated oscillator 24 times out, nothing occurs, since the timing circuit of the oscillator 24 is reset when the flip-flop 23 is reset to its "0" state and remains reset until the flip-flop 23 once again is set to its "1" state. If, however, the probe 25 does not produce an output within the time required for the gated oscillator 24 to produce the first output pulse, the output pulse from the gated oscillator actuates an alarm 27 which indicates that the electromagnet structure 10 has not operated within a predetermined maximum allowable time, which time is equal to the operating time of the gated oscillator 24.

When it is desired to test the release time of the electromagnet 10, the switch 22 is operated to direct the input pulse through an inverter 28 so that the flip-flop 23 is set to its "1" state and the gated oscillator 24 is actuated whenever the operating current for the coil 18 is turned off. During such a test the probe 25 is used to detect vibrations caused by collision of the armature 15 with the abutment 16 of the frame 11, so that the flip-flop 23 is reset to its "0" state as soon as the armature 15 has moved from the pole 14 to the abutment 16. Again, the gated oscillator 24 operates the alarm 27 if the armature 15 does not engage the abutment 16 within a predetermined time established by the timing cycle of the oscillator 24.

It should be noted that a provision for automatically or manually resetting the flip-flop 23 to its "0" state may be provided to reset the flip-flop at the beginning of a test or after the alarm 27 has been energized.

Although only one embodiment of the invention is shown in the drawing and described in the foregoing specification, it will be understood that the invention is not limited to the specific embodiment shown, but is capable of modification, rearrangement and substitution of parts and elements without departing from the spirit of the invention.

What is claimed is:

1. An improved electromagnet operating-time measuring device of the type including a flip-flop that is set by an electromagnet energizing pulse and that is reset by a pulse indicative of a completion of the movement of the armature of the electromagnet, a timing circuit that is actuated whenever the flip-flop is in the set condition and is deactuated whenever the flip-flop is in the reset condition, and an alarm that is operated by the timing circuit at the end of its operating cycle, wherein the improvement comprises:

a piezoelectric device responsive to mechanical vibrations generated by the armature upon completion of its movement for producing an output indicative of the completion of the movement of the armature of the electromagnet; and means for resetting the flip-flop in response to an output from the piezoelectric device to deactuate the timing device.

2. A circuit for measuring the operating time of a member which moves from a first position to a second position where it engages a mechanical stop, generating mechanical vibrations, which comprises:

electromagnetic means for driving the member between the two positions;

means for initiating operation of the driving means;

a piezoelectric device for providing an output in response to vibrations caused by engagement of the member with the stop;

a binary device for registering the initiating means and for registering the output from the piezoelectric device, the binary device being set to a first state in response to registering the initiating means and being set to the second state in response to registering the output from the piezoelectric device; and a timing device, having a predetermined period of operation, and being actuated whenever the binary device is in the first state and being deactuated whenever the binary device is in the second state.

3. A method of determining whether an electromagnet operates within a predetermined time, the electromagnet having an armature which moves from a first position to a second position where it engages a stop, creating mechanical vibrations, which comprises:

applying an input signal to the electromagnet winding to initiate movement of the armature;

simultaneously applying the input signal to a first input of a binary device to set the binary device in its first state;

applying the output of the binary device to a timing circuit having a time-out equal to the predetermined time and being responsive to the binary device being in the first state to begin to time-out and being responsive to the binary device being in the second state to terminate its time-out;

sensing the mechanical vibrations when the armature engages the stop with a piezoelectric device to obtain an electrical output therefrom;

applying the output of the piezoelectric device to a second input of the binary device to set the binary device to the second state to terminate the time-out of the timing circuit; and determining whether the timing circuit has completed its time-out.

References Cited

UNITED STATES PATENTS 3,253,214    5/1966    Heilweil    324—28
3,289,077    11/1966    Miller    324—70

OTHER REFERENCES

Pulse and Digital Circuits, Millman & Taub, McGraw-Hill, 1956, pages 508–9.

RUDOLPH V. ROLINEC, Primary Examiner

R. J. CORCORAN, Assistant Examiner

U.S. Cl. X.R.

73—67; 324—181